(12) United States Patent
Kang et al.

(10) Patent No.: US 10,391,748 B2
(45) Date of Patent: Aug. 27, 2019

(54) PLASTIC FILM LAMINATE

(71) Applicant: LG CHEM, LTD., Seoul (KR)

(72) Inventors: Joon Koo Kang, Daejeon (KR); Hang Suk Choi, Daejeon (KR); Yeong Rae Chang, Daejeon (KR); Hyeok Jeong, Daejeon (KR)

(73) Assignee: LG CHEM, LTD., Seoul (KR)

( * ) Notice: Subject to any disclaimer, the term of this patent is extended or adjusted under 35 U.S.C. 154(b) by 246 days.

(21) Appl. No.: 15/037,377

(22) PCT Filed: Nov. 19, 2014

(86) PCT No.: PCT/KR2014/011145
§ 371 (c)(1),
(2) Date: May 18, 2016

(87) PCT Pub. No.: WO2015/076567
PCT Pub. Date: May 28, 2015

(65) Prior Publication Data
US 2016/0297178 A1  Oct. 13, 2016

(30) Foreign Application Priority Data

Nov. 19, 2013 (KR) .................. 10-2013-0140664
Nov. 18, 2014 (KR) .................. 10-2014-0161177

(51) Int. Cl.
| | |
|---|---|
| *B32B 27/08* | (2006.01) |
| *C09D 133/08* | (2006.01) |
| *G02B 1/14* | (2015.01) |
| *C09D 201/02* | (2006.01) |
| *C09D 167/04* | (2006.01) |
| *B32B 27/06* | (2006.01) |
| *C09D 4/00* | (2006.01) |
| *C08J 7/04* | (2006.01) |
| *B32B 7/12* | (2006.01) |
| *B32B 27/18* | (2006.01) |
| *B32B 7/06* | (2019.01) |
| *B32B 15/02* | (2006.01) |
| *B32B 15/08* | (2006.01) |
| *B32B 23/08* | (2006.01) |
| *B32B 27/16* | (2006.01) |
| *B32B 27/26* | (2006.01) |
| *B32B 27/28* | (2006.01) |
| *B32B 27/30* | (2006.01) |
| *B32B 27/32* | (2006.01) |
| *B32B 27/36* | (2006.01) |
| *C08B 37/16* | (2006.01) |
| *C08L 5/16* | (2006.01) |

(52) U.S. Cl.
CPC ............. *B32B 27/08* (2013.01); *B32B 7/06* (2013.01); *B32B 7/12* (2013.01); *B32B 15/02* (2013.01); *B32B 15/08* (2013.01); *B32B 23/08* (2013.01); *B32B 27/06* (2013.01); *B32B 27/16* (2013.01); *B32B 27/18* (2013.01); *B32B 27/26* (2013.01); *B32B 27/281* (2013.01); *B32B 27/306* (2013.01); *B32B 27/308* (2013.01); *B32B 27/32* (2013.01); *B32B 27/322* (2013.01); *B32B 27/325* (2013.01); *B32B 27/36* (2013.01); *C08B 37/0012* (2013.01); *C08J 7/042* (2013.01); *C08L 5/16* (2013.01); *C09D 4/00* (2013.01); *C09D 133/08* (2013.01); *C09D 167/04* (2013.01); *C09D 201/02* (2013.01); *G02B 1/14* (2015.01); *B32B 2255/10* (2013.01); *B32B 2255/26* (2013.01); *B32B 2255/28* (2013.01); *B32B 2264/10* (2013.01); *B32B 2270/00* (2013.01); *B32B 2307/202* (2013.01); *B32B 2307/206* (2013.01); *B32B 2307/412* (2013.01); *B32B 2307/414* (2013.01); *B32B 2307/51* (2013.01); *B32B 2307/536* (2013.01); *B32B 2307/54* (2013.01); *B32B 2307/558* (2013.01); *B32B 2307/584* (2013.01); *B32B 2307/732* (2013.01); *B32B 2307/748* (2013.01); *B32B 2457/20* (2013.01); *C08J 2300/22* (2013.01); *C08J 2367/02* (2013.01); *C08J 2433/08* (2013.01); *Y10T 428/24959* (2015.01); *Y10T 428/24975* (2015.01); *Y10T 428/24983* (2015.01)

(58) Field of Classification Search
CPC .. B32B 27/00–27/42; B32B 7/00–7/14; Y10T 428/00–428/8305; C09J 7/00–7/50
See application file for complete search history.

(56) References Cited

U.S. PATENT DOCUMENTS

| | | | |
|---|---|---|---|
| 8,343,628 B2 | 1/2013 | Fukuda et al. | |
| 2009/0042034 A1* | 2/2009 | Ito ...................... | C08B 37/0015 428/413 |

(Continued)

FOREIGN PATENT DOCUMENTS

| | | |
|---|---|---|
| CN | 101581801 A | 11/2009 |
| CN | 101600771 A | 12/2009 |

(Continued)

OTHER PUBLICATIONS

Machine translation of JP2013035210. Retrieved Mar. 15, 2018.*

(Continued)

*Primary Examiner* — Prashant J Khatri
(74) *Attorney, Agent, or Firm* — Rothwell, Figg, Ernst & Manbeck, P.C.

(57) ABSTRACT

The present invention relates to a plastic film laminate, and more specifically, the present invention relates to a plastic film laminate showing impact resistance and excellent properties. According to the present invention, the plastic film laminate showing high hardness, impact resistance, scratch resistance, and transparency and having excellent processability can be provided.

16 Claims, No Drawings

(56) References Cited

U.S. PATENT DOCUMENTS

| | | | |
|---|---|---|---|
| 2010/0068534 A1 | | 3/2010 | Paul et al. |
| 2010/0087611 A1 | * | 4/2010 | Urakawa ............ C08G 18/3853 526/261 |
| 2010/0182679 A1 | | 7/2010 | Han et al. |
| 2011/0105688 A1 | * | 5/2011 | Ruslim ............... C08B 37/0015 525/54.26 |
| 2011/0151223 A1 | | 6/2011 | Kim et al. |
| 2011/0234948 A1 | | 9/2011 | Yoon et al. |
| 2013/0177748 A1 | * | 7/2013 | Hirai ....................... B32B 27/08 428/203 |
| 2015/0299505 A1 | | 10/2015 | Kang et al. |
| 2016/0196894 A1 | | 7/2016 | Matsuda et al. |

FOREIGN PATENT DOCUMENTS

| | | | |
|---|---|---|---|
| CN | 102257087 A | | 11/2011 |
| JP | S64-050021 A | | 2/1989 |
| JP | H07-128649 A | | 5/1995 |
| JP | H08-136905 A | | 5/1996 |
| JP | 2003-279713 A | | 10/2003 |
| JP | 2006244771 A | * | 9/2006 |
| JP | 2008-127413 A | | 6/2008 |
| JP | 2008-310286 A | | 12/2008 |
| JP | 2009-204725 A | | 9/2009 |
| JP | 2009242786 A | * | 10/2009 ......... C08G 18/6258 |
| JP | 2009-274255 A | | 11/2009 |
| JP | 2010-275385 A | | 12/2010 |
| JP | 2011-075705 A | | 4/2011 |
| JP | 2011-079219 A | | 4/2011 |
| JP | 2011-093133 A | | 5/2011 |
| JP | 2011-521813 A | | 7/2011 |
| JP | 4731743 B2 | | 7/2011 |
| JP | 2011-201087 A | | 10/2011 |
| JP | 2012-035431 A | | 2/2012 |
| JP | 2013035210 A | * | 2/2013 |
| JP | 2014-113705 A | | 6/2014 |
| KR | 10-2001-0076642 A | | 8/2001 |
| KR | 10-2007-0103606 A | | 10/2007 |
| KR | 10-2008-0072364 A | | 8/2008 |
| KR | 10-2009-0053061 A | | 5/2009 |
| KR | 10-2009-0088511 A | | 8/2009 |
| KR | 10-2009-0118724 A | | 11/2009 |
| KR | 10-2010-0026014 A | | 3/2010 |
| KR | 10-2010-0041992 A | | 4/2010 |
| KR | 10-2010-0070999 A | | 6/2010 |
| KR | 10-1295325 B1 | | 8/2013 |
| KR | 10-2013-0117958 A | | 10/2013 |
| TW | 201016822 A | | 5/2010 |
| WO | 2012-002706 A2 | | 1/2012 |

OTHER PUBLICATIONS

Machine translation of JP2006244771. Retrieved Mar. 15, 2018.*
Machine translation of JP2009242786. Retrieved Mar. 16, 2018.*
International Search Report issued for International Application No. PCT/KR2014/011145 dated Mar. 12, 2015 (2 pages).
Extended Search Report dated Dec. 19, 2016 issued for the corresponding EP Patent Application No. 14864129.3, 7 pages.

* cited by examiner

PLASTIC FILM LAMINATE

CROSS-REFERENCE TO RELATED APPLICATIONS

This application is a 35 U.S.C. § 371 National Phase Entry Application from PCT/KR2014/011145, filed on Nov. 19, 2014, and designating the United States, which claims priority under 35 U.S.C. § 119 to Korean Patent Application No. 10-2013-0140664, filed on Nov. 19, 2013, and Korean Patent Application No. 10-2014-0161177, filed on Nov. 18, 2014, the entire contents of which are incorporated herein by reference.

BACKGROUND OF THE INVENTION

(a) Field of the Invention

The present invention relates to a plastic film laminate. More specifically, the present invention relates to a plastic film laminate showing high hardness and excellent properties.

(b) Description of the Related Art

With the advance of mobile appliances such as smart phones, tablet PCs and the like, substrates for displays have recently been required to become lighter and slimmer Display windows or front panels of such mobile appliances are generally made of glass or reinforced glass both of which have excellent mechanical properties. However, glass suffers from the disadvantage of being heavy and being easily broken by an external impact.

As an alternative to glass, plastic resin films have emerged. Their light weight and resistance to impact are consistent with the trend of pursuing lighter and slimmer mobile appliances. Particularly, a film with high hardness and wear resistance is required. In this regard, it is proposed to utilize a structure in which the substrate is coated with a hard coating layer.

First of all, increasing the thickness of the hard coating layer is considered as an approach to improving the surface hardness thereof. In fact, the hard coating layer should be of a certain thickness to ensure the surface hardness sufficient to replace glass. As the hard coating layer increases in thickness, the surface hardness thereof may become higher. However, a thicker hard coating layer, although increasing the surface hardness, is more prone to setting shrinkage which leads to wrinkling or curling with the concomitant production of cracks or exfoliations, and thus thick hard coating layers are difficult to employ in practice.

Recently, some methods have been proposed for conferring a high hardness on plastic films, without the problems of cracking and setting shrinkage-induced curling.

Korean Patent Application Publication No. 2010-0041992 discloses a coating composition, free of monomers, comprising a binder resin based on ultraviolet-curable polyurethane acrylate oligomers. However, the film formed from said hard coating composition has a pencil hardness of about 3H, and thus the strength thereof is not sufficient to be a substitute for glass panels for displays.

SUMMARY OF THE INVENTION

Accordingly, the present invention provides a plastic film laminate which exhibits high hardness and excellent properties, for resolving the problems.

In accordance with an aspect thereof, the present invention provides a plastic film laminate, including the first plastic film including at least one coating layer; and the second plastic film including at least one coating layer, wherein the first plastic film and the second plastic film are laminated together by an adhesive layer According to the present invention, the plastic film laminate shows high hardness, impact resistance, scratch resistance, and transparency, and it can be usefully applied to touch panels of mobile terminals, smart phones or tablet PCs, and as a cover or device panel for various displays.

DETAILED DESCRIPTION OF THE EMBODIMENTS

The plastic film laminate of the present invention includes a first plastic film including at least one coating layer; and a second plastic film including at least one coating layer, wherein the first plastic film and the second plastic film are laminated together by an adhesive layer.

Furthermore, all of the terms used in the specification are taken only to illustrate embodiments, and are not intended to limit the present invention. As used herein and in the appended claims, the singular forms "a", "an", and "the" include plural reference unless the context clearly dictates otherwise.

Additionally, the word "on" or "above," as used in the context of formation or construction of one element, means pertaining to the direct formation or construction of one element on another element directly or the additional formation or construction of one element between layers or on a subject or substrate.

The above detailed descriptions of embodiments of the present invention are not intended to be exhaustive or to limit the invention to the precise form disclosed above. While specific embodiments of, and examples for the invention are described above for illustrative purposes, various equivalent modifications are possible within the scope of the invention, as those skilled in the relevant art will recognize.

Hereinafter, the plastic film laminate of the present invention is explained in more detail.

According to the present invention, a plastic film laminate including a first plastic film including at least one coating layer and a second plastic film including at least one coating layer, wherein the first plastic film and the second plastic film are laminated together by an adhesive layer is provided.

According to one embodiment of the present invention, the first plastic film and the second plastic film may independently include a supporting substrate and a coating layer(s) formed on one side or both sides of the supporting substrate equally or differently, and the coating layer may include a photo-cured crosslinked copolymer.

Namely, the first plastic film may include a coating layer formed on only one side of the supporting substrate or coating layers formed on both sides of the supporting substrate. The second plastic film may also include a coating layer formed on only one side of the supporting substrate or coating layers formed on both sides of the supporting substrate.

In the first and the second plastic films of the present invention, so long as it is transparent, any plastic resin, whether capable of being stretched or not, may be used for the supporting substrate on which the coating layer is formed, without limitations imposed thereto. According to one embodiment of the present invention, the supporting substrate may include, for example, a polyester such as polyethyleneterephthalate (PET), a polyethylene such as ethylene vinyl acetate (EVA), cyclic olefin polymer (COP), cyclic olefin copolymer (COC), polyacrylate (PAC), polycarbonate (PC), polyethylene (PE), polymethylmethacrylate (PMMA), polyetheretherketon (PEEK), polyethylenenaphthalate (PEN), polyetherimide (PEI), polyimide (PI), triacetylcellulose (TAC), MMA (methyl methacrylate), or a fluoro-polymer. The substrate may be a single layer structure, and, if necessary, may be a multilayer structure including two or more layers composed of the same or different materials, but is not particularly limited.

According to one embodiment of the present invention, the supporting substrate may be a multilayer substrate made of polyethyleneterephthalate (PET) or a two-layer substrate formed by coextrusion of polymethylmethacrylate (PMMA)/polycarbonate (PC).

Furthermore, according to one embodiment of the present invention, the supporting substrate may be a substrate including a copolymer of polymethylmethacrylate (PMMA) and polycarbonate (PC).

The thickness of the supporting substrate may be about 30 to about 1,200 μm, or about 50 to about 800 μm, but is not limited thereto.

The first and the second plastic films of the present invention independently include a coating layer formed on one side or both sides of the supporting substrate equally or differently.

And, according to one embodiment of the present invention, the coating layer includes a photo-cured crosslinked copolymer, and the photo-cured crosslinked copolymer may be a copolymer that is prepared by crosslink-polymerizing at least one binder selected from the group consisting of a 3- to 6-functional acrylate monomer, a 1- to 2-functional acrylate monomer, a 1-to 6-functional acrylate monomer, and a photo-curable elastic polymer.

The coating layer formed on one side or both sides of the first and the second plastic films may independently include photo-cured crosslinked copolymers equal to or different from each other.

For example, the photo-cured crosslinked copolymer may be a crosslinking copolymer of a 1- to 6-functional acrylate monomer and the photo-curable elastic polymer or a crosslinking copolymer of a 3- to 6-functional acrylate monomer and the photo-curable elastic polymer.

As used herein, the term "acrylate" is intended to encompass acrylate, methacrylate, and derivatives thereof with various substituents.

As used herein, the term "photo-curable elastic polymer" refers to a polymer which is of elasticity and contains a functional group that undergoes UV light-triggered crosslink polymerization.

According to one embodiment of the present invention, the photo-curable elastic polymer may have an elongation of about 15% or more, for example, about 15 to about 200%, or about 20 to about 200%, or about 20 to about 150%, as measured according to ASTM D638. When the photo-curable elastic polymer having the elongation of above range is used, it is possible to form the coating layers satisfying all of high hardness and high impact resistance.

When the photo-cured crosslinked copolymer is the crosslinking copolymer of the photo-curable elastic polymer and the 1- to 6-functional acrylate monomer, high hardness and flexibility can be provided to the coating layer including the same and particularly it is possible to ensure excellent impact resistance by preventing the damage by an external impact.

According to one embodiment of the present invention, the photo-curable elastic polymer may be a polymer or oligomer having a weight average molecular weight of about 1,000 to about 600,000 g/mol or about 10,000 to about 600,000 g/mol.

The photo-curable elastic polymer may be at least one selected from the group consisting of polycaprolactone, urethane acrylate polymers, and polyrotaxane, for example.

Among the polymers used as the photo-curable elastic polymer, the polycaprolactone is formed by the ring-opening polymerization of caprolactone, and has excellent physical properties such as flexibility, impact resistance, durability and the like.

The urethane acrylate polymer includes urethane bonds and has excellent elasticity and durability.

The polyrotaxane is a polymer composed of dumbbell-shaped molecules and cyclic compounds (macrocycle) which are structurally interlocked. The dumbbell-shaped molecule includes a certain linear molecule and stopper groups placed at both ends of the linear molecule and the linear molecule passes through the inside of the macrocycle, and the macrocycle can move along the linear molecule and is prevented by the stopper groups from dissociation.

According to one embodiment of the present invention, the photo-curable elastic polymer may include a rotaxane compound including a macrocycle connected with a lactone compound with a (meth)acrylate moiety introduced to the end thereof; a linear compound passing through the macrocycle; and the stopper groups placed at both ends of the linear compound so as to prevent the macrocycle from dissociation.

No particular limitations are imposed on the macrocycle if it is large enough to pass or surround the linear molecule. The macrocycle may include a functional group such as a hydroxide group, an amino group, a carboxyl group, a thiol group, an aldehyde group or the like, which can react with other polymers or compounds. Specific examples of the macrocycle may be α-cyclodextrin, β-cyclodextrin, γ-cyclodextrin and mixtures thereof.

Furthermore, any compound of linear form having regular molecular weight or more may be used as the linear molecule without restriction, and polyalkylene compounds or polylactone compounds may be used. Specifically, polyoxyalkylene compounds including $C_1$-$C_8$ oxyalkylene repeating units or polylactone compounds including $C_3$-$C_{10}$ lactone repeating units may be used.

Meanwhile, the stopper group may be appropriately adjusted depending on the characteristics of the rotaxane compound to be prepared. For example, the stopper group may be at least one selected from the group consisting of a dinitrophenyl group, a cyclodextrin group, an amantane group, a trilyl group, a fluorescein group, and a pyrene group.

For example, said 1- to 6-functional acrylate monomer may be hydroxyethylacrylate (HEA), hydroxyethylmethacrylate (HEMA), hexanedioldiacrylate (HDDA), tripropylene glycol diacrylate (TPGDA), ethyleneglycol diacrylate (EGDA), trimethylolpropane triacrylate (TMPTA), trimethylolpropaneethoxy triacrylate (TMPEOTA), glycerinpropoxylated triacrylate (GPTA), pentaerythritol tetraacrylate (PETA), dipentaerythritol hexaacrylate (DPHA), and the like. These 1- to 6-functional acrylate monomers may be used alone or in combination.

When the photo-cured crosslinked copolymer is the crosslinked copolymer of the photo-curable elastic polymer and the 1- to 6-functional acrylate monomer, the weight ratio thereof is not limited particularly but it may be a copolymer in which 20 to 80 parts by weight of the photo-curable elastic polymer and 80 to 20 parts by weight of the 1- to 6-functional acrylate monomer is crosslinked, or 20 to 60 parts by weight of the photo-curable elastic polymer and 40 to 80 parts by weight of the 1- to 6-functional acrylate monomer is crosslinked, based on 100 parts by weight of the photo-curable crosslinking copolymer. When the coating layer includes the photo-cured crosslinked copolymer in which high content of the photo-curable elastic polymer of high elasticity is crosslinked, the film laminate can achieves high impact resistance and good properties.

According to one embodiment of the present invention, the coating layer formed on one side or both sides of the supporting substrate may have the thickness of 50 μm or more, for example, the thickness of about 50 to about 300 μm, or about 50 to about 200 μm, or about 50 to about 150 μm, or about 70 to about 150 μm.

According to another embodiment of the present invention, the photo-curable crosslinking copolymer may be a crosslinking copolymer of the 3- to 6-functional acrylate monomer.

According to sill another embodiment of the present invention, the photo-curable crosslinking copolymer may be a crosslinking copolymer of the 3- to 6-functional acrylate monomer and the 1- to 2-functional acrylate monomer.

According to sill another embodiment of the present invention, the photo-curable crosslinking copolymer may be a crosslinking copolymer of the 3- to 6-functional acrylate monomer and the photo-curable elastic polymer.

For example, said 3- to 6-functional acrylate monomer may be trimethylolpropane triacrylate (TMPTA), trimethylolpropaneethoxy triacrylate (TMPEOTA), glycerinpropoxylated triacrylate (GPTA), pentaerythritol tetraacrylate (PETA), dipentaerythritol hexaacrylate (DPHA), and the like. These 3- to 6-functional acrylate monomers may be used alone or in combination.

Furthermore, in the plastic film of the present invention, the coating layer may further include inorganic particles dispersed in the photo-cured crosslinked copolymer. Particularly, it may be preferable that the outermost coating layer includes the inorganic particles, for improving the surface hardness.

According to one embodiment of the present invention, the inorganic particle may have a particle size of nanoscale. For example, inorganic particles having the particle size of about 100 nm or less, about 10 to about 100 nm, or about 10 to about 50 nm may be used. And, for example, silica particles, aluminum oxide particles, titanium oxide particles, or zinc oxide particles may be used as the inorganic particles.

The hardness of the coating layer can be more improved by including the inorganic particles.

According to one embodiment of the present invention, in the case of that the coating layer includes the inorganic particles, the coating layer may include about 40 to about 90 parts by weight of the photo-curable crosslinking copolymer and about 10 to about 60 parts by weight of the inorganic particles, or about 50 to about 80 parts by weight of the photo-curable crosslinking copolymer and about 20 to about 50 parts by weight of the inorganic particles, based on 100 parts by weight of the coating layer. The plastic film having excellent properties can be formed by including the photo-curable crosslinking copolymer and the inorganic particles with said content range.

Meanwhile, the coating layer may further include typical additives used in the art to which the present invention pertains such as a surfactant, a yellowing inhibitor, a leveling agent, an antifouling agent and the like in addition to the photo-curable crosslinking copolymer and the inorganic particles. Here, the content of the additives may be variously adjusted to the degree that the physical properties of the plastic film of the present invention are not deteriorated and thus its content is not particularly limited but, for example, about 0.1 to 10 parts by weight of the additives may be included therein, based on 100 parts by weight of the photo-curable crosslinking copolymer.

According to one embodiment of the present invention, for example, the coating layer may include a surfactant as an additive. The surfactant may be a 1- or 2-functional fluorine acrylate, a fluorine surfactant, or a silicon surfactant. In this context, the surfactant may be contained in a dispersed or crosslinked form in the crosslinking copolymer. Furthermore, the coating layers may include a yellowing inhibitor as an additive. The yellowing inhibitor may be a benzophenone-based compound or a benzotriazole-based compound.

The coating layer may be formed by coating a coating composition including the binder disclosed above, a photoinitiator, and optionally organic solvents, inorganic particles, and additives on the supporting substrate and photocuring the same.

Examples of the photoinitiator may include, but are not limited to or by them, 1-hydroxy-cyclohexyl-phenyl ketone, 2-hydroxy-2-methyl-1-phenyl-1-propanone, 2-hydroxy-1-[4-(2-hydroxyethoxy)phenyl]-2-methyl-1-propanone, methylbenzoylformate, α,α-dimethoxy-α-phenylacetophenone, 2-benzoyl-2-(dimethylamino)-1-[4-(4-morpholinyl)phenyl]-1-butanone, 2-methyl-1-[4-(methylthio)phenyl]-2-(4-morpholinyl)-1-propanone, diphenyl(2,4,6-trimethylbenzoyl)-phosphine oxide, bis(2,4,6-trimethylbenzoyl)-phenylphosphine oxide, and the like. Furthermore, the photoinitiator may be commercially available, such as those sold under brand name, Irgacure 184, Irgacure 500, Irgacure 651, Irgacure 369, Irgacure 907, Darocur 1173, Darocur MBF, Irgacure 819, Darocur TPO, Irgacure 907, and Esacure KIP 100F. These photoinitiators may be used alone or in combination.

Examples of the organic solvent available in the present invention may include: alcohols such as methanol, ethanol, isopropyl alcohol, butanol and the like; alkoxy alcohols such as 2-methoxy ethanol, 2-ethoxy ethanol, 1-methoxy-2-propanol and the like; ketones such as acetone, methyl ethyl ketone, methyl isobutyl ketone, methyl propyl ketone, cyclohexanone and the like; ethers such as propyleneglycol monopropyl ether, propyleneglycol monomethyl ether, ethyleneglycol monoethyl ether, ethyleneglycol monopropyl ether, ethyleneglycol monobutyl ether, diethyleneglycol monomethyl ether, diethyleneglycol monoethyl ether, diethyleneglycol monopropyl ether, diethyleneglycol monobutyl ether, diethyleneglycol-2-ethylhexyl ether and the like; and aromatic solvents such as benzene, toluene, xylene and the like. These organic solvents may be used alone or in combination.

The solid content in the coating composition includes the binder, the photoinitiator, and other additives, and the weight ratio of the solid content and the solvent may be about 70:30 to about 99:1. When the coating composition has a high solid content, the viscosity of the composition may increase and it makes it possible to form a thick coating layer, and thus the coating layer having high thickness, for example 50 μm or more, can be obtained therefrom.

The first and the second plastic films are laminated together by an adhesive layer.

The thickness of the adhesive layer may be about 1 to about 200 μm, about 1 to about 100 μm, or about 5 to about 50 μm.

The storage modulus (G') at room temperature of the adhesive layer which joins the first and the second plastic films may be measured by using a dynamic viscoelasticity analyzer in accordance with a common measuring method, and the measured storage modulus at room temperature (25° C.) of the cured adhesive layer may be about 40 to about 700 kPa, preferably about 40 to about 500 kPa, and more preferably about 40 to about 200 kPa. When the storage modulus of the adhesive layer is lower than 40 kPa, there is high probability of bubble generation. And when the storage modulus of the adhesive layer is higher than 700 kPa, the adhesive strength at the interface of the first and the second plastic films decreases because the adhesive layer becomes too hard, and thus durability, impact resistance, and flexibility of the film laminate may decrease.

The adhesive layer may include a photo(UV)-curable resin or a thermosetting resin for satisfying said storage modulus range. For example, the adhesive layer may be formed by photo-curing and/or heat-curing a composition for the adhesive layer including a photo-curable acrylate-based polymer, oligomer, monomer, or a mixture thereof as the acrylate-based monomer component.

For example, the acrylate-based monomer component may include a (meth)acrylate; an alkyl(meth)acrylate having a C1-C14 linear or branched alkyl group such as methyl (meth)acrylate, ethyl(meth)acrylate, propyl(meth)acrylate, isopropyl(meth)acrylate, butyl(meth)acrylate, butyl(meth)acrylate, butyl(meth)acrylate, pentyl(meth)acrylate, hexyl(meth)acrylate, 2-ethylhexyl(meth)acrylate, ethylbutyl(meth)acrylate, octyl(meth)acrylate, isooctyl(meth)acrylate, isononyl(meth)acrylate, lauryl(meth)acrylate, and/or tetradecyl(meth)acrylate; or an oligomer or a polymer formed therefrom, but it is not limited to or by them.

The acrylate-based monomer may have a weight average molecular weight of 1,000,000 to 5,000,000 g/mol, preferably 1,000,000 to 4,000,000 g/mol, and more preferably 1,500,000 to 3,000,000 g/mol.

If the composition for the adhesive layer is a thermosetting composition, it may further include a curing agent which can crosslink the acrylate-based monomer component.

The curing agent may be what is commonly used for preparing an adhesive layer in the related art, and for example, it may be at least one selected from the group consisting of epoxy-based curing agents and isocyanate-based curing agents.

The curing agent may be 0.01 to 10 parts by weight per 100 parts by weight of the acrylate-based monomer component but the ratio may vary according to the elastic modulus and the adhesion strength to be achieved.

If the composition for the adhesive layer is a photo-curable composition, it may further include a photoinitiator.

The composition for the adhesive layer may further include additives such as other curable resins, monomers, a UV stabilizer, and an antioxidant, with necessity.

The adhesive layer may be any layer, such as a freestanding layer, membrane, film, a resin layer cured from a coating composition, and the like, having adhesive property and satisfying said conditions, regardless of the name or the shape.

The total thickness of the plastic film laminate of the present invention including the first and the second plastic films laminated by the adhesive layer may be about 0.3 to about 1.5 mm, or about 0.5 to about 1.5 mm, or about 0.7 to about 1.0 mm.

The plastic film laminate of the present invention may be a laminate in which 5 or more distinct layers or substrates are laminated. For example, the plastic film laminate of the present invention may have the structure of coating layer/supporting substrate/adhesive layer/supporting substrate/coating layer, or the structure of coating layer/supporting substrate/coating layer/adhesive layer/supporting substrate/coating layer, or the structure of coating layer/supporting substrate/adhesive layer/coating layer/supporting substrate/coating layer, or the structure of coating layer/supporting substrate/coating layer/adhesive layer/coating layer/supporting substrate/coating layer, and so on. At this time, the materials composing the coating layers may be independently equal to or different from each other.

According to one embodiment of the present invention, the plastic film laminate of the present invention may further include at least one layer, membrane, or film, such as another plastic resin film, an adhesive film, a release film, a conductive film, a conductive layer, a coating layer, a curable resin layer, a non-conductive film, a metal mesh layer, or a patterned metal layer on at least one of the first plastic film and the second plastic film. In addition, the layer, membrane, or film may be any form of a monolayer, a bilayer or a lamination. The layer, membrane, or film may be formed on the coating layer by laminating a freestanding film with the aid of an adhesive or an adhesive film, or by the method of coating, deposition, or sputtering, but it is not limited to or by them.

At this time, to increase adhesiveness with said other layer, membrane, or film, the surface of the plastic film to be contacted with the same may be treated with plasma, corona discharge, or an alkaline solution such as sodium hydroxide or potassium hydroxide.

According to one embodiment of the present invention, the first and the second plastic films may be prepared respectively by coating the coating composition on one side or both sides of the supporting substrate and photo-curing the same.

When the coating layer is formed by using the coating composition, it may be formed by a common method in the related art. For example, the coating composition including the ingredients disclosed above on one side of the supporting substrate at first. At this time, any method that is available in the art would be used in the application of the coating composition without particular limitations. For example, the coating composition may be applied by bar coating, knife coating, roll coating, blade coating, die coating, microgravure coating, comma coating, slot die coating, lip coating, solution casting, and the like.

Subsequently, the coating composition coated on the substrate is photo-cured by exposing the same to UV light so as to form the coating layer.

The dosage of UV radiation may be, for example, about 20 to about 600 mJ/cm$^2$ or about 50 to about 500 mJ/cm$^2$. Any light source that can be used in the art would be applied to the present invention without particular limitation. For example, a high-pressure mercury lamp, a metal halide lamp, a black light fluorescent lamp and the like may be used. The photo-curing process may be carried out by irradiating UV light at above dosage for about 30 sec to about 15 min, or for about 1 to about 10 min.

The thickness of the completely cured coating layer may be about 50 to about 300 μm, or about 50 to about 200 μm, or about 50 to about 150 μm, or about 70 to about 150 μm. When the thickness of the coating layer is in said range, the plastic film can exhibit high hardness without a problem of curling or cracking.

In the case of that the first and the second plastic films includes the coating layers on both sides thereof, the coating composition is coated on the other side, namely, the backside, of the supporting substrate. Subsequently, the coating composition coated on the substrate is photo-cured by exposing the same to UV light so as to form the coating layer. At this time, UV light is provided to the opposite side of the coated side in the step of photo-curing the coating composition so as to obtain a flat plastic film by offsetting the curling which may be generated by the curing shrinkage of the former coated composition in the opposite direction. Therefore, it does not need an additional flattening process.

The first and the second plastic films obtained as disclosed above may be laminated by the adhesive layer according to the lamination method and the like so as to prepare the plastic film laminate of the present invention.

For use as a cover for mobile terminals or tablet PCs, it is important to improve the hardness of the plastic film to the level of replacing glass. However, it is not easy to prepare a film without curling or cracking while securing high hardness and impact resistance by using plastic resins.

The plastic film laminate of the present invention is less prone to curling or cracking even if it is prepared to have high thickness, for example, the total thickness of 0.3 mm or more, and thus the plastic film having high transparency and impact resistance can be obtained. Furthermore, the processing steps and times for preparing the same may be shortened and the productivity may be improved because the film laminate can be prepared by laminating two plastic films without many coating and curing processes for increasing the thickness. Since the film laminate has the structure of a plurality of laminated coating layers, it can exhibit not only high transparency and high hardness but also high impact resistance due to the plurality of coating layers effectively absorbing or offsetting an external impact.

The plastic film laminate of the present invention may have excellent hardness and impact resistance enough to replace glass. For example, the plastic film of the present invention may not crack even after the steel bead weighing 22 g is freely dropped ten times from the height of 60 cm thereto.

In addition, the plastic film laminate of the present invention may have a pencil hardness of 7H or more, 8H or more, or 9H or more at the load of 1 kg.

Furthermore, the plastic film laminate of the present invention may show only two or less scratches after rubbing the same 400 times back and forth with a steel wool #0000 under the load of 500 g on a friction tester.

The plastic film laminate of the present invention may have a light transmittance of about 90.0% or more, or about 91.0% or more, and a haze of about 1.5% or less, about 1.0% or less, or about 0.8% or less.

Furthermore, the plastic film laminate of the present invention may show an initial color b value (b* by CIE 1976 L*a*b* color space) of about 1.5 or less. And, the difference between the initial color b and the color b measured after exposing the film to UV-B light from an ultraviolet lamp for 72 hrs or more may be about 0.5 or less, or about 0.4 or less.

And, when the plastic film laminate of the present invention is disposed on a plane after exposing the same to a temperature of 50° C. or more and a humidity of 80% or more for 70 hrs, the maximum distance between the plane and each edge or side of the plastic film laminate may be about 1.0 mm or less, about 0.6 mm or less, or about 0.3 mm or less. More particularly, when the plastic film laminate of the present invention is disposed on a plane after exposing the same to a temperature of 50° C. to 90° C. and a humidity of 80% to 90% for 70 to 100 hrs, the maximum distance between the plane and each edge or side of the plastic film laminate may be about 1.0 mm or less, about 0.6 mm or less, or about 0.3 mm or less.

The plastic film laminate of the present invention exhibits excellent physical properties including hardness, impact resistance, scratch resistance, transparency, durability, light resistance, and light transmittance, and has useful applications in various fields. For example, the plastic film laminate of the present invention can be used in various fields, for example, the touch panels of mobile terminals, smart phones or tablet PCs, and as covers or device panels for various displays.

EXAMPLES

Preparation of Photo-Cured Elastic Polymer

Preparation Example 1

In a reactor, 50 g of a caprolactone-grafted polyrotaxane polymer [A1000, Advanced Soft Material INC] was mixed with 4.53 g of Karenz-AOI [2-acryloylethyl isocyanate, Showadenko Inc.], 20 mg of dibutyltin dilaurate [DBTDL, Merck Corp.], 110 mg of hydroquinone monomethylene ether, and 315 g of methyl ethyl ketone. Then, the mixture was reacted at 70° C. for 5 hrs to obtain a polyrotaxane including cyclodextrin connected with a polylactone compound with an acrylate moiety introduced to the end thereof as a macrocycle.

The obtained polyrotaxane had the weight average molecular weight of 600,000 g/mol, and the elongation of 20% measured according to ASTM D638.

Preparation of Composition for Adhesive Layer

Preparation Example 2

A composition for coating layer was prepared by mixing 0.3 parts by weight of coronate L, an isocyanate-based curing agent, with 100 parts by weight of the acrylate-based copolymer (weight average molecular weight: 1,800,000 g/mol, molecular weight distribution: 5) in which 2-ethylhexyl acrylate, methyl acrylate, and acrylic acid were copolymerized with the weight ratio of 65:25:10.

Preparation Example 3

A composition for coating layer was prepared by mixing 0.3 parts by weight of coronate L, an isocyanate-based curing agent, with 100 parts by weight of the acrylate-based copolymer (weight average molecular weight: 800,000 g/mol, molecular weight distribution: 4) in which 2-ethylhexyl acrylate and hydroxybutyl acrylate were copolymerized with the weight ratio of 98:2.

Preparation Example 4

A composition for coating layer was prepared by mixing 30 parts by weight of dipentaerythritolhexacrylate (DPHA), 1.5 parts by weight of a photoinitiator (proprietary name: Irgacure 184), 1 parts by weight of coronate L, an isocyanate-based curing agent, with 100 parts by weight of the acrylate-based copolymer (weight average molecular weight: 1,400,000 g/mol, molecular weight distribution: 3.8) in which 2-ethylhexyl acrylate and acrylic acid were copolymerized with the weight ratio of 90:10.

Example 1

A first coating composition was prepared by mixing 6 g of trimethylolpropane triacrylate (TMPTA), 4 g of the polyrotaxane prepared in Preparation Example 1, 0.2 g of a photoinitiator (proprietary name: Darocur TPO), 0.1 g of a benzotriazole-based yellowing inhibitor (proprietary name: Tinuvin 400), 0.05 g of a fluorine surfactant (proprietary name: FC4430), and 1 g of methylethylketone.

The first coating composition was coated on one side of a PET supporting substrate having the thickness of 188 μm and the size of 15 cm×20 cm. Subsequently, a first plastic film including a coating layer of 100 μm thickness which was formed on one side of the substrate was prepared by exposing the coated composition to UV light of 280-350 nm by using a black light fluorescence lamp for photo-curing the same.

A second coating composition was prepared by mixing 9 g of a silica-dipentaerythritolhexacrylate (DPHA) composite in which silica nanoparticles with a particle size of 20-30 nm were dispersed by about 40 wt % (silica 3.6 g, DPHA 5.4 g), 1 g of the polyrotaxane of Preparation Example 1, 0.2 g of a photoinitiator (proprietary name: Darocur TPO), 0.1 g of a benzotriazole-based yellowing inhibitor (proprietary name: Tinuvin 400), 0.05 g of a fluorine surfactant (proprietary name: FC4430), and 1 g of methylethylketone.

The second coating composition was coated on one side of a PET supporting substrate having the thickness of 188 μm and the size of 15 cm×20 cm. Subsequently, a second plastic film including a coating layer of 100 μm thickness which was formed on one side of the substrate was prepared by exposing the coated composition to UV light of 280-350 nm by using a black light fluorescence lamp for photo-curing the same.

The composition for adhesive layer of Preparation Example 2 was laminated between the PET supporting substrates of the first and the second plastic films to be the thickness of 50 μm, and then the plastic film laminate was prepared by heat-curing the same at temperature of 60° C.

Example 2

A first coating composition was prepared by mixing 6 g of trimethylolpropane triacrylate (TMPTA), 4 g of a urethane acrylate polymer (proprietary name: UA200PA, Shinnakamura Chemicals Corp., weight average molecular weight: 2,600 g/mol, elongation measured according to ASTM D638: 170%), 0.2 g of a photoinitiator (proprietary name: Darocur TPO), 0.1 g of a benzotriazole-based yellowing inhibitor (proprietary name: Tinuvin 400), 0.05 g of a fluorine surfactant (proprietary name: FC4430), and 1 g of methylethylketone.

A second coating composition was prepared by mixing 9 g of a silica-dipentaerythritolhexacrylate (DPHA) composite in which silica nanoparticles with a particle size of 20-30 nm were dispersed by about 40 wt % (silica 3.6 g, DPHA 5.4 g), 1 g of a urethane acrylate polymer (UA200PA), 0.2 g of a photoinitiator (proprietary name: Darocur TPO), 0.1 g of a benzotriazole-based yellowing inhibitor (proprietary name: Tinuvin 400), 0.05 g of a fluorine surfactant (proprietary name: FC4430), and 1 g of methylethylketone.

The first coating composition was coated on one side of a PET supporting substrate having the thickness of 188 μm and the size of 15 cm×20 cm. Subsequently, a first coating layer of 100 μm thickness was prepared by exposing the coated composition to UV light of 280-350 nm by using a black light fluorescence lamp for photo-curing the same.

The second coating composition was coated on the other side of the supporting substrate. Subsequently, a second coating layer of 100 μm thickness was prepared by exposing the coated composition to UV light of 280-350 nm by using a black light fluorescence lamp for photo-curing the same, so as to prepare the plastic film including the first coating layer and the second coating layer on both sides thereof.

The composition for adhesive layer of Preparation Example 2 was laminated between two plastic films prepared above to be the thickness of 50 μm, and then the plastic film laminate was prepared by heat-curing the same at temperature of 60° C.

Example 3

A first coating composition was prepared by mixing 6 g of trimethylolpropane triacrylate (TMPTA), 4 g of a urethane acrylate polymer (proprietary name: UA340P, Shinnakamura Chemicals Corp., weight average molecular weight: 13,000 g/mol, elongation measured according to ASTM D638: 150%), 0.2 g of a photoinitiator (proprietary name: Darocur TPO), 0.1 g of a benzotriazole-based yellowing inhibitor (proprietary name: Tinuvin 400), 0.05 g of a fluorine surfactant (proprietary name: FC4430), and 1 g of methylethylketone.

A second coating composition was prepared by mixing 9 g of a silica-dipentaerythritolhexacrylate (DPHA) composite in which silica nanoparticles with a particle size of 20-30 nm were dispersed by about 40 wt % (silica 3.6 g, DPHA 5.4 g), 1 g of a urethane acrylate polymer (UA340P), 0.2 g of a photoinitiator (proprietary name: Darocur TPO), 0.1 g of a benzotriazole-based yellowing inhibitor (proprietary name: Tinuvin 400), 0.05 g of a fluorine surfactant (proprietary name: FC4430), and 1 g of methylethylketone.

The first coating composition was coated on one side of a PET supporting substrate having the thickness of 188 μm and the size of 15 cm×20 cm. Subsequently, a first coating layer of 100 μm thickness was prepared by exposing the coated composition to UV light of 280-350 nm by using a black light fluorescence lamp for photo-curing the same.

The second coating composition was coated on the other side of the supporting substrate. Subsequently, a second coating layer of 100 μm thickness was prepared by exposing the coated composition to UV light of 280-350 nm by using a black light fluorescence lamp for photo-curing the same, so as to prepare the plastic film including the first coating layer and the second coating layer on both sides thereof.

The composition for adhesive layer of Preparation Example 2 was laminated between two plastic films prepared above to be the thickness of 50 μm, and then the plastic film laminate was prepared by heat-curing the same at temperature of 60° C.

Comparative Example 1

The plastic film on which a first and a second coating layers were formed was prepared according to the same method as in Example 2.

Subsequently, the composition for adhesive layer of Preparation Example 3 was laminated between two plastic films prepared above to be the thickness of 50 μm, and then the plastic film laminate was prepared by heat-curing the same at temperature of 60° C.

Comparative Example 2

The plastic film on which a first and a second coating layers were formed was prepared according to the same method as in Example 2.

Subsequently, the composition for adhesive layer of Preparation Example 4 was laminated between two plastic films prepared above to be the thickness of 50 μm, and then the plastic film laminate was prepared by photo-curing and thermosetting the same with UV radiation of 200 mJ/cm² at temperature of 60° C.

The structures and total thicknesses of the plastic film laminates of Examples 1 to 3 and Comparative Examples 1 and 2 are summarized in Table 1.

TABLE 1

|  | Laminate Structure* | Storage Modulus (G')** of Adhesive Layer | Total Thickness (unit: μm) |
|---|---|---|---|
| Example 1 | Structure 1 | 69 kPa | 626 |
| Example 2 | Structure 2 | 69 kPa | 826 |
| Example 3 | Structure 3 | 69 kPa | 826 |
| Comparative Example 1 | Structure 4 | 20 kPa | 826 |
| Comparative Example 2 | Structure 5 | 800 kPa | 826 |

*Laminate Structure
Structure 1: the first coating layer/PET substrate/adhesive layer (Preparation Example 2)/PET substrate/the second coating layer.
Structure 2: the first coating layer/PET substrate/the second coating layer/adhesive layer (Preparation Example 2)/the first coating layer/PET substrate/the second coating layer.
Structure 3: the first coating layer/PET substrate/the second coating layer/adhesive layer (Preparation Example 2)/the first coating layer/PET substrate/the second coating layer.
Structure 4: the first coating layer/PET substrate/the second coating layer/adhesive layer (Preparation Example 3)/the first coating layer/PET substrate/the second coating layer.
Structure 5: the first coating layer/PET substrate/the second coating layer/adhesive layer (Preparation Example 4)/the first coating layer/PET substrate/the second coating layer.
**The storage modulus (G') of the adhesive layer was measured by using a dynamic viscoelasticity analyzer (ARES-RDA, TA instruments Inc.). The measurement was carried out at room temperature (25° C.) with the frequency of 1 rad/s by using a 8 mm stainless steel disk-type plate, and the thickness of the adhesive layer was 1 mm.

TEST EXAMPLES

<Measuring Methods>
1) Pencil Hardness

Pencil hardness was evaluated according to the Japanese Standard JIS K5400. In this regard, a pencil hardness meter was reciprocated three times on the top layer (the second coating layer) of each of the plastic film laminates under a load of 1.0 kg to determine the hardness at which no scratches appeared.

2) Scratch Resistance

After being loaded to a friction tester, a steel wool (#0000) was reciprocated 400 times on the top layer (the second coating layer) of each of the plastic film laminates under a load of 0.5 kg, and scratches thus formed were counted. Evaluation was made of the scratch resistance of the films by marking 0 for two or less scratches, A for three to less than five scratches, and X for five or more scratches.

3) Light Resistance

Differences in color b value of the plastic films before and after exposure to UV-B light from an UV lamp for 72 hrs were measured.

4) Transmittance and Haze

Transmittance and haze were measured by using a spectrophotometer (equipment name: CHO-400))

5) Curl Property at High Humidity and Temperature

After a plastic film laminate piece with dimensions of 10 cm×10 cm was stored for 72 hrs in a chamber maintained at the temperature of 85° C. and the humidity of 85%, it was placed on a flat plane. It was evaluated as OK when the distance between one side of each edge of the piece and the plane was 1 mm or less and as X when the distance was over 1 mm 6) Cylindrical Bending Test Each of the plastic film laminates was wound on a cylindrical mandrel having a diameter of 3 cm so that the first coating layer of each film laminate was toward outside. It was evaluated as OK when the plastic film laminate was not cracked and as X when the plastic film was cracked.

7) Impact Resistance

The impact resistance of the second coating layer of each of the plastic film laminates was evaluated by determining whether or not each of the plastic film laminates was cracked when a 22 g steel ball was freely dropped 10 times thereon from a height of 60 cm. Each of the plastic film laminates was evaluated as OK when it was not cracked, and as X when it was cracked.

8) Evaluation on Appearance

The surface of the film was observed by the naked eye whether there were bubble generation, impurities, cracking, and defects in the adhesion state.

The results of the measured properties are summarized in Table 2 below.

TABLE 2

|  | Examples | | | Comparative Examples | |
|---|---|---|---|---|---|
|  | 1 | 2 | 3 | 1 | 2 |
| Pencil hardness | 8H | 9H | 9H | 9H | 9H |
| Scratch resistance | O | O | O | O | O |
| Light resistance | 0.24 | 0.28 | 0.18 | 0.20 | 0.22 |
| Transmittance | 91.3 | 91.0 | 92.8 | 92.5 | 92.0 |
| Haze | 0.5 | 0.7 | 0.4 | 0.3 | 0.4 |
| Bending test | OK | OK | OK | OK | OK |
| Curl property at high humidity & temperature | OK | OK | OK | OK | X |
| Impact resistance | OK | OK | OK | OK | X |
| Appearance | Good | Good | Good | Bubble generation | Defect in adhesion |

As shown in Table 2, all of the plastic film laminates of Examples 1 to 3 exhibit good properties. However, the film laminate of Comparative Example 1 of which the storage modulus of the adhesive layer was low showed bubble generation, and the film laminate of Comparative Example 2 of which the storage modulus of the adhesive layer was too high showed inferior impact resistance and curling characteristic because the adhesion strength decreased and the first and the second plastic films could not be bonded properly.

What is claimed is:

1. A plastic film laminate, including:
   a first plastic film including at least one coating layer disposed on at least one side of a first supporting substrate; and
   a second plastic film including at least one coating layer disposed on at least one side of a second supporting substrate,
   wherein the first plastic film and the second plastic film are laminated together by an adhesive layer,
   wherein a thickness of each coating layer is independently equal to or different from each other and is 70 to 300 μm,
   wherein the coating layers include a photo-cured cross-linked copolymer formed from a copolymer that is prepared by crosslink-polymerizing a photo-curable elastic polymer and at least one binder selected from the group consisting of a 3- to 6-functional acrylate monomer, a 1- to 2-functional acrylate monomer, and a 1- to 6-functional acrylate monomer; and
   wherein the plastic film laminate shows a pencil hardness of 7H or more at the load of 1 kg, and wherein a maximum distance between a plane and each edge or side of the plastic film laminate is 1.0 mm or less, when the film is disposed on the plane after exposure to a temperature of 50° C. or more and a humidity of 80% or more for 70 hrs.

2. The plastic film laminate according to claim 1, wherein a storage modulus (G') of the adhesive layer is 40 to 700 kPa.

3. The plastic film laminate according to claim 1, wherein the coating layer included in the first and the second plastic films independently further include inorganic particles dispersed in the photo-cured crosslinked copolymer equally or differently.

4. The plastic film laminate according to claim 1, wherein the photo-curable elastic polymer has an elongation of 15 to 200%, as measured according to ASTM D638.

5. The plastic film laminate according to claim 1, wherein the photo-curable elastic polymer includes at least one selected from the group consisting of polycaprolactone, urethane acrylate polymers, and polyrotaxane.

6. The plastic film laminate according to claim 5, wherein the polyrotaxane includes a macrocycle connected with a lactone compound having a (meth)acrylate moiety introduced to the end of the lactone compound; a linear compound passing through the macrocycle; and stopper groups placed at both ends of the linear compound so as to prevent the macrocycle from dissociation.

7. The plastic film laminate according to claim 1, wherein the 1- to 2-functional acrylate monomer includes at least one selected from the group consisting of hydroxyethylacrylate (HEA), hydroxyethylmethacrylate (HEMA), hexanedioldiacrylate (HDDA), tripropyleneglycol diacrylate (TPGDA), and ethyleneglycol diacrylate (EGDA).

8. The plastic film laminate according to claim 1, wherein the 3- to 6-functional acrylate monomer includes at least one selected from the group consisting of trimethylolpropane triacrylate (TMPTA), trimethylolpropaneethoxy triacrylate (TMPEOTA), glycerin-propoxylated triacrylate (GPTA), pentaerythritol tetraacrylate (PETA), and dipentaerythritol hexaacrylate (DPHA).

9. The plastic film laminate according to claim 1, wherein the supporting substrates include at least one selected from the group consisting of polyethyleneterephtalate (PET), ethylene vinyl acetate (EVA), cyclic olefin polymer (COP), cyclic olefin copolymer (COC), polyacrylate (PAC), polycarbonate (PC), polyethylene (PE), polymethylmethacrylate (PMMA), polyetheretherketon (PEEK), polyethylenenaphthalate (PEN), polyetherimide (PEI), polyimide (PI), triacetylcellulose (TAC), MMA (methyl methacrylate), and a fluoro-polymer.

10. The plastic film laminate according to claim 1, wherein the thickness of each coating layer is 70 to 150 μm.

11. The plastic film laminate according to claim 1, wherein a total thickness of the plastic film laminate is 0.3 to 1.5 mm.

12. The plastic film laminate according to claim 1, wherein the plastic film laminate does not crack after a steel bead weighing 22 g is freely dropped ten times from a height of 60 cm thereto.

13. The plastic film laminate according to claim 1, wherein the plastic film laminate shows two or less scratches, after rubbing the same 400 times back and forth with a steel wool #0000 under the load of 500 g on a friction tester.

14. The plastic film laminate according to claim 1, wherein the plastic film laminate exhibits a light transmittance of 90% or more, a haze of 1.5 or less, and a b* value of 1.5 or less.

15. The plastic film laminate according to claim 1, wherein a difference in the color b* value of the plastic film laminate is 0.5 or less when it is exposed to UV-B light for 72 hrs.

16. The plastic film laminate according to claim 1, further including at least one layer selected from the group consisting of a plastic resin film, an adhesive film, a release film, a conductive film, a conductive layer, a coating layer, a curable resin layer, a non-conductive film, a metal mesh layer, and a patterned metal layer on the first plastic film or the second plastic film.

* * * * *